United States Patent [19]

Fierer

[11] Patent Number: 4,642,935

[45] Date of Patent: Feb. 17, 1987

[54] WASTE PLUMBING ROACH TRAP

[76] Inventor: Mayer Fierer, 400 N. Oakhurst Dr., Beverly Hills, County of Los Angeles, Calif. 90210

[21] Appl. No.: 860,802

[22] Filed: May 8, 1986

[51] Int. Cl.⁴ .............................................. A01M 1/00
[52] U.S. Cl. ...................................... 43/121; 43/131; 43/112; 4/661
[58] Field of Search .............. 43/121, 124, 131, 132.1, 43/107, 112, 98, 114; 4/252 R, 661

[56] References Cited

U.S. PATENT DOCUMENTS 1,654,832  1/1928  Pohl ...................................... 43/131
3,393,408  7/1968  Martin ...................................... 43/61

FOREIGN PATENT DOCUMENTS 481043  7/1929  Fed. Rep. of Germany ........ 43/131

Primary Examiner—Nicholas P. Godici
Assistant Examiner—Kurt Rowan
Attorney, Agent, or Firm—William H. Maxwell

[57] ABSTRACT

A plumbing trap in the form of a fitting for installation in a vertically disposed waste pipe, characterized by axially spaced and aligned upper and lower tube sections with an annular opening therebetween, said opening being in communication with a chamber surrounding the upper tube section, and in which there is killing means alternately in the form of a pool of poison or an electrically charged conductor, said opening and chamber providing space in excess of the jumping and bridging capability of the roaches, whereby they are forced to pass over the killing means.

14 Claims, 5 Drawing Figures

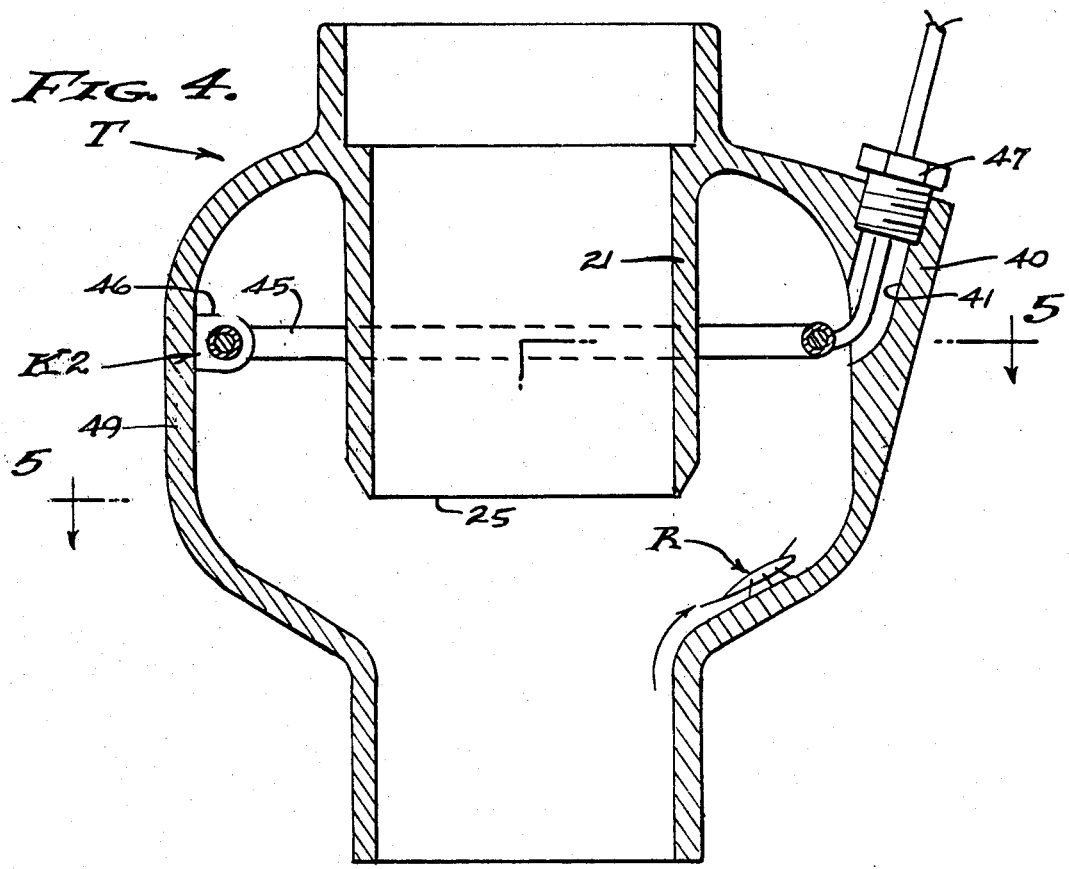
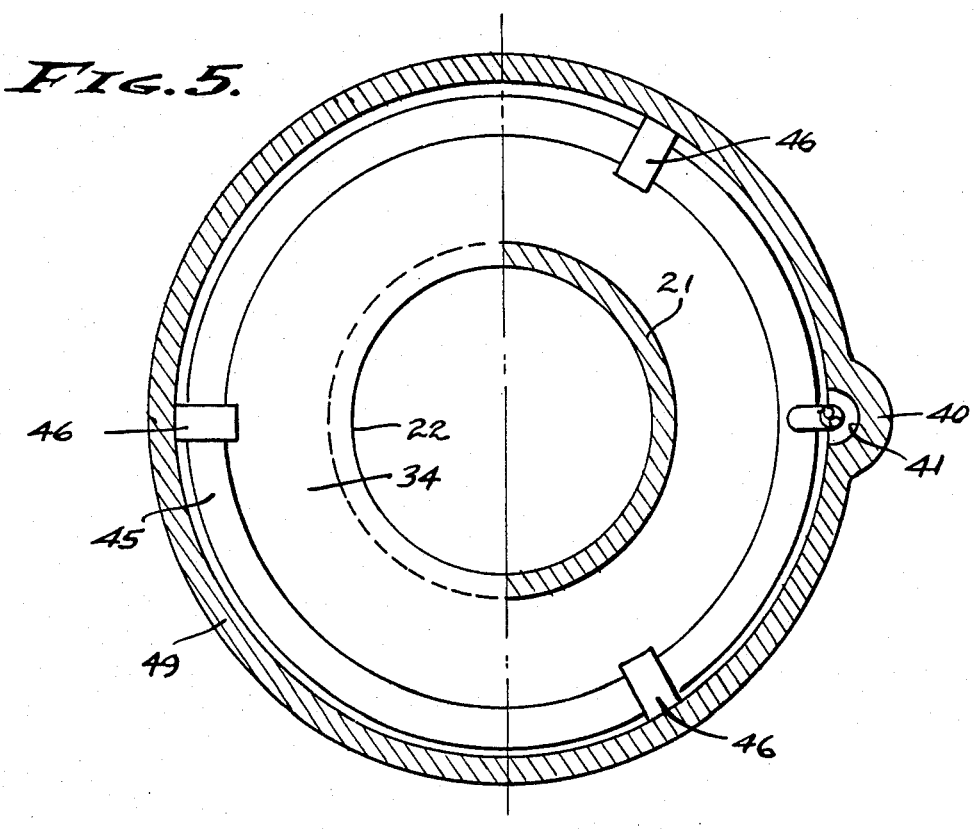

WASTE PLUMBING ROACH TRAP

BACKGROUND

This invention relates to pest control, and is particularly concerned with cockroaches which are any of the numerous orthopterous insects of the family Blattidae and characterized by aa flattened body, rapid movements, and nocturnal habits, and many of which are household pests. Roaches are known worldwide as persistent vermin that scavenge and travel through sewers and the like. Accordingly, they are carriers of filth and are considered to be carriers of disease, and therefore are unwanted in the domestic household. However, as much precaution as a person might resort to, to barricade roaches from the household, or to kill them, they still persist in entry into households. And a main port of entry into a household used by these vermin is through the waste plumbing that extends openly to the sewers. Therefore, it is a general object of this invention to prevent ingress of roaches through waste plumbing, by providing an effecitve trap in said plumbing between the sewer and the interior of the household or any like building structure.

Roaches are not deterred by the presence of water and they thrive in their passage through sewers and plumbing pipes, and they pass through water traps with ease. Further, they are known to jump and to bridge across crevices and openings, and they are capable of clinging to and traveling upon most any surface. The inner diameter surface of sewers and plumbing pipe is ideal for roach travel, it being an object of this invention to establish a substantial opening that must be bridged by the roaches in their travel up a sewer or plumbing pipe. It is also an object of this invention to provide a trap which must be trespassed upon by the roaches when attempting to pass the aforesaid opening, whereby the roaches can be subjected to killing means.

Sewer and plumbing pipes are of tubular elongated cylinder form, waste pipes being of substantial diameter for the passage of solid waste matter, it being an object of this invention to interrupt the inner diameter wall of a waste pipe so that an opening therein enforces travel of the roach over the aforesaid trap and killing means. In practice, the Waste Plumbing Roach Trap of this invention is a unit or modular device in the form of a fitting that is inserted into a vertically disposed section of household plumbing, or any like structural plumbing. The vertical section chosen for installation of this unit is any riser or main entry ahead of a lavatory or watercloset, or any like plumbing facility such as a washing machine and garbage disposer etc.

When cockroaches are confronted there are a number of ways by which they can be killed. They will die when exposed to poisons or toxic substances, they will die when exposed to electrical discharge, or they can be mechanically decimated. The primary object of this invention is to kill the roaches as they are entrained over the aforesaid trap and the killing means, said killing means being shown herein in two forms, a poison trough and an electrical discharge conductor. Characteristically, the trough or conductor are ring-shaped members disposed horizontally in a surrounding chamber of annular configuration.

The effectivness of this roach killer is such as to require the removal of deceased roaches at frequent intervals of time. To this end it is an object of this invention to provide flushing means for washing them down the plumbing in which this unit is installed. Further, it is an object of this invention to provide for restoring the killing means from time to time, preferably with injection means that supplies liquid poison or suitable toxic substance to the aforesaid trough. The electrical killing means operates continuously when energized.

SUMMARY OF THE INVENTION

The Waste Plumbing Roach Trap as it is disclosed herein is a unitary fitting or module adapted to be installed in a vertically disposed plumbing waste pipe. In practice, this fitting is permanently installed ahead of the plumbing fixtures with drain openings from the interior of building structures, principally households and the like. The vertical waste pipe is separated and the sections thereof coupled by this fitting which forms an open unobstructed continuation of the inner diameter walls of said pipe sections. In accordance with this invention, this coupling fitting is comprised of axially spaced upper and lower tubular sections joined by a housing that establishes an opening therebetween, said opening being surrounded by a closed chamber in which there is a trap over which the roach must pass in the direction of ingress. The trap incorporates killing means which is inherently contacted by the roach, whereby the roach is subjected to desctruction or death; chemically or electrically as hereinafter disclosed.

The forgoing and various other objects and features of this invention will be apparent and fully understood from the following detained description of the typical preferred form and application thereof, throughout which description reference is made to the accompanying drawings.

THE DRAWINGS

FIG. 4 is a view similar to FIG. 2 and shows a second form of the invention.

And, FIG. 5 is a sectional view taken as indicated by lines 5—5 on FIG. 4.

PREFERRED EMBODIMENT

Figure 1:
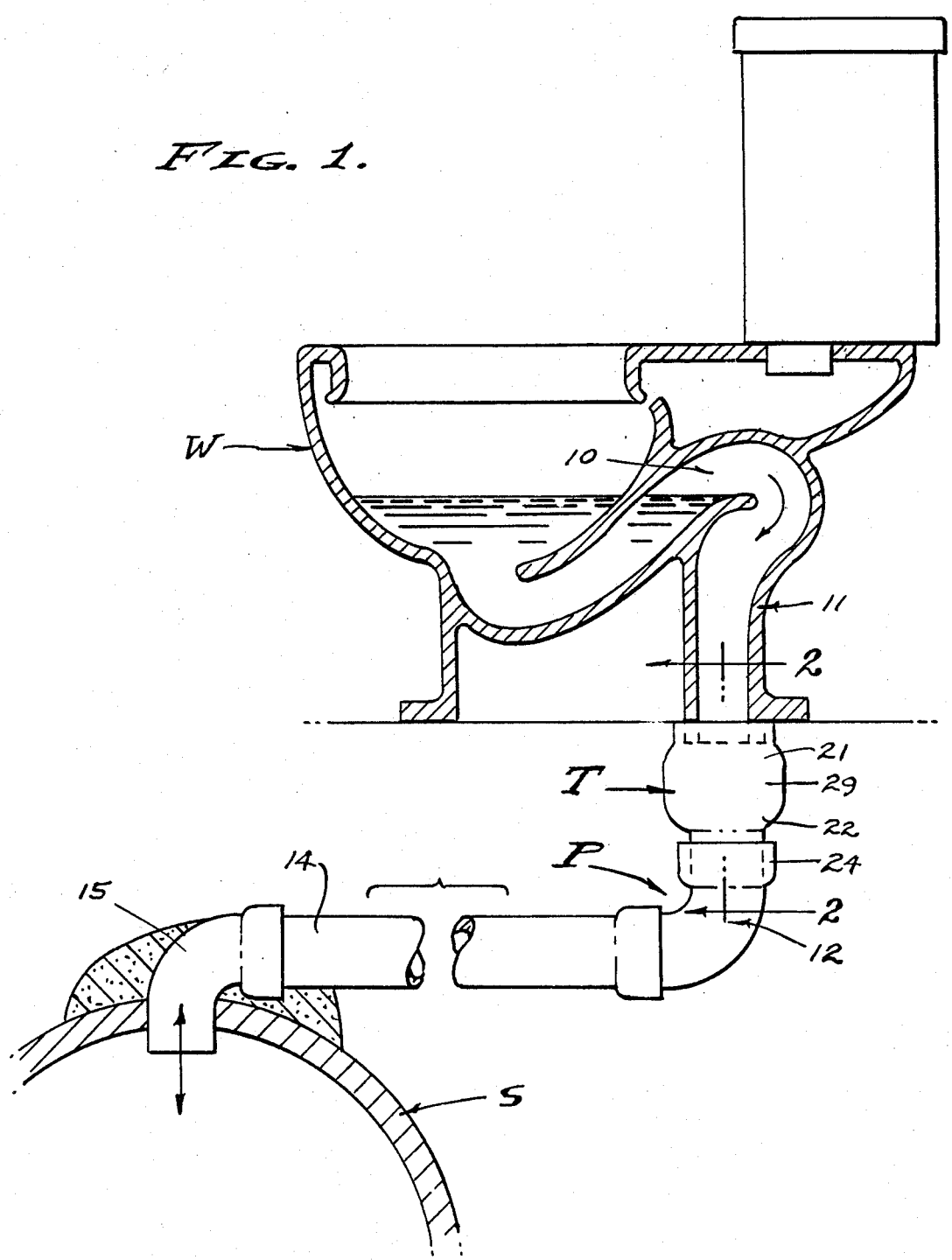
FIG. 1 is a sectional view taken through a typical watercloset, showing the water trap and the Roach Trap of the present invention installed in the waste plumbing that extends to a sewer.

Referring now to the drawings, FIG. 1 shows a domestic watercloset W and the roach trap T installed in waste plumbing P that extends to a sewer S. The roach trap T is preferably a unit in the form of a fitting that is inserted into the plumbing P in any vertical section thereof leading to a plumbing fixture having a drain. A feature of all plumbing fixtures is that a water trap is involved so as to separate building air space from sewage gases in the waste pipe, the air trap 10 being shown incorporated in the watercloset W fixture. It is to be understood that fixtures without integral water traps are plumbed so as to have that same feature. Also, the plumbing fixtures are vented individually or severally (not shown) and such a vent can be plumbed into the waste pipe below the roach trap T so as to be affected thereby the same as the waste line plumbing P shown.

Despite the presence of water traps, the roaches swim therethrough and emerge within the household.

In accordance with this invention, I provide a roach trap T fitting that is installed in a vertical part of the plumbing P, preferably at or below the plumbing fixture W to be protected thereby, or below a plurality of plumbing fixtures incorporated in a common plumbing system. The part of the plumbing in which this trap T fitting is installed is characteristically vertically disposed, and the trap T is inserted therein much like a coupling. That is, the trap T fitting couples separated sections of the vertically disposed plumbing part so that vertical flow continuity is maintained through upper and lower section 11 and 12 thereof. In practice, the trap T fitting can be coupled directly to the plumbing fixture as shown herein, in which case the upper plumbing section 11 is part of the plumbing fixture W below the trap 10 therein. As shown, the lower plumbing section 12 is an elbow 13 that turns the waste flow laterally into a horizontally disposed run 14 (the gravity fall is not shown) that turns through another elbow 15 into the sewer S. The plumbing is open into the sewer S, so as to conduct liquid waste and solids thereto, to vent, and also permitting access for the roaches from the sewer S to the trap or traps 10 where they have ingress into a building interior.

The trap T fitting involves upper and lower tubular sections 21 and 22, each of which is a continuation of the waste plumbing P and one a continuation of the other. However, the tubular sections 21 and 22 are separated leaving a substantial annular opening 23 therebetween. In practice, the sections are of the same inner and outer diameters of the continuing plumbing sections 11 and 12 to which they are coupled as by bell joints 24, or by screw joints as may be required. The vertical separation of the tubular sections 21 and 22 is selected and/or adjusted to be in excess of the jumping or bridging capabilities of the roaches R to be controlled thereby.

The upper and lower fitting sections 21 and 22 are coaxial, whereby the upper section flushes into the lower section. As shown, the terminal lower end 25 of section 21 is normal to its axis and horizontally disposed, with a relatively sharp edge at the inner diameter bore thereof. In accordance with this invention, the lower section 22 opens upwardly through the annular opening 23 between the spaced sections and into a surrounding annulus or chamber 30. The chamber 30 is formed by a housing 29 that integrally joins the sections 21 and 22 and is comprised of an upwardly divergent wall 34 of conical configuration that continues into a cylindrical wall 32 surrounding the tubular section 21 with substantial clearance in excess of the jumping and bridging capability of the roaches. Accordingly, the roaches are led into chamber 30 which extends at full diameter coextensively with the tubular section 21, as shown. And, the top of the chamber 30 is closed by an inturned header 33 joined to the section 21. Thus, chamber 30 is an annulus that opens only between coaxial spaced tubular sections 21 and 22.

Figure 2:
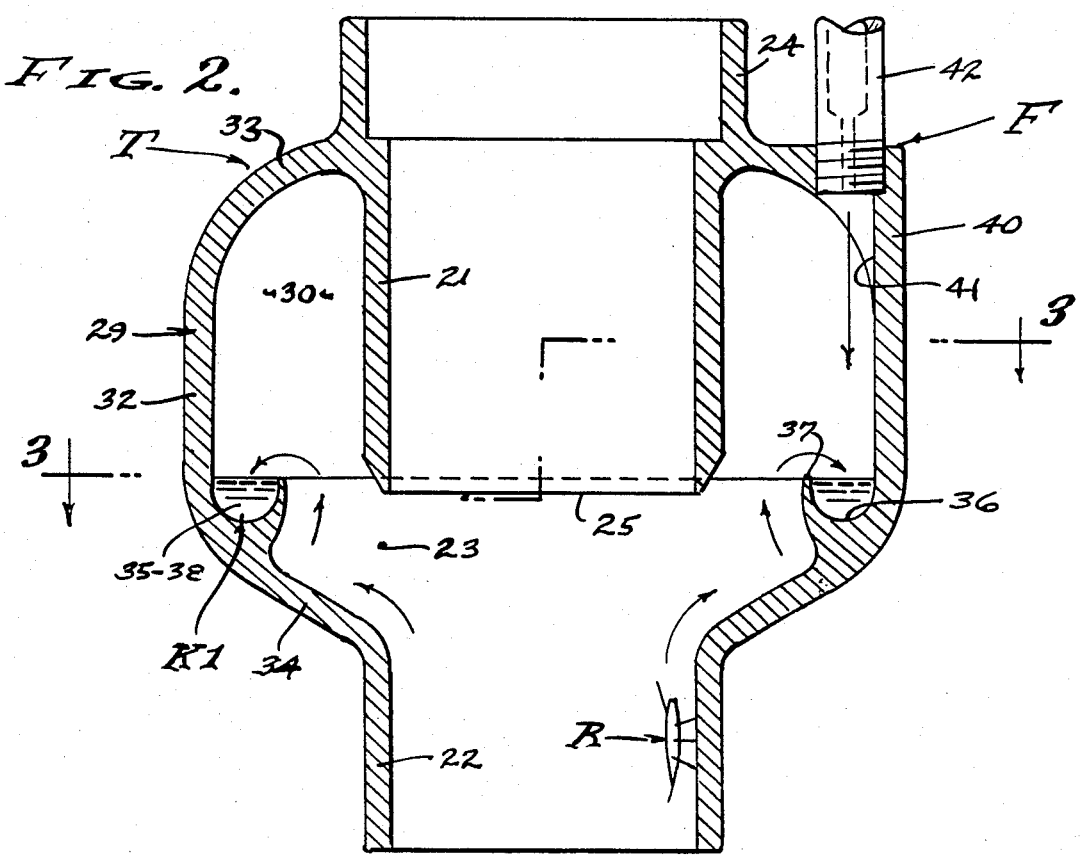
FIG. 2 is an enlarged sectional view taken as indicated by line 2—2 of FIG. 1, showing the Roach Trap removed as a unit.
Figure 3:
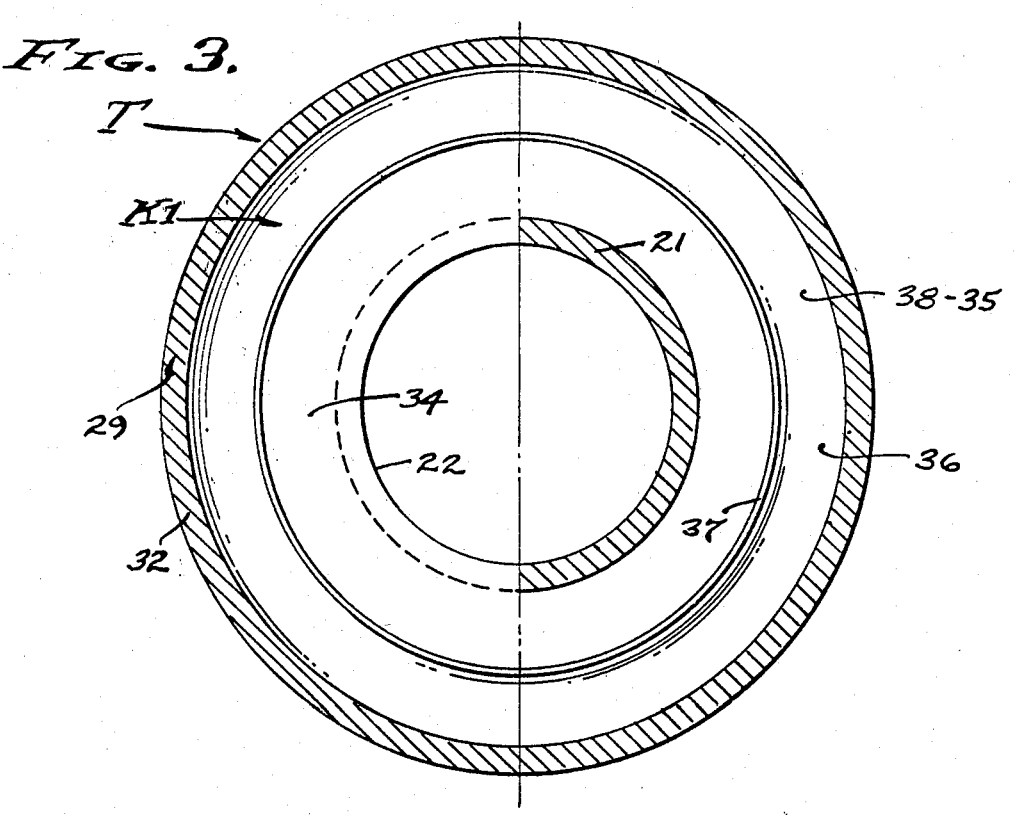
FIG. 3 is a sectional view taken as indicated by line 3—3 on FIG. 2.

Referring now to the first form of the invention as detailed in FIGS. 2 and 3 of the drawings, a killing means K1 in the form of a surrounding pool 35 of poison toxic to roaches is provided, over which the roaches R are forced to travel when approaching the household. The pool 35 is in the plane of and surrounds the lower terminal end 25 of the tubular upper section 21 and is concentrically spaced therefrom a substantial distance leaving an annulus therebetween in excess of the jumping and bridging capability of the roaches. The pool 35 is contiguous to the inner diameter wall of the housing 29, and the roaches are forced to negotiate the pool. In practice, the pool 35 is comprised of a circular basin 36 integral with the housing 29 and has a relatively sharp rim 37 concentric with and surrounding the lower end 25 of section 21 above a plane coincidental therewith. The basin 36 of pool 35 can be filled to the rim 37 with a suitable poison or toxic liquid 38, as shown. Accordingly, the roaches are subjected to contact with said poison liquid 38 when passing over the rim 37 of pool 35.

Fill and flush means F is provided to load and clean the above described pool 35, to remove the deceased roaches and to reload the pool 35 with the poison liquid 38. In practice, a boss 40 is provided on the side wall of housing 29, with a substantially vertical opening 41 therethrough tangent with the basin 36. A pipe or nozzle 42 is carried by the boss 40 and is aligned to strike the pool 35 as is indicated by the arrow in FIG. 2. High pressure flushing fluid or liquid can be forceably delivered by the nozzle 42, and alternately a measured amount of poison can be gently applied to fill the pool 35. Suitable state of the art means is employed to apply the flushing fluid and/or poison in the manner described.

Referring now to the second form of the invention as detailed in FIGS. 4 and 5 of the drawings, a killing means K2 in the form of a surrounding conductor 45 with electrical potential is provided, over which the roaches are forced to travel when approaching the household. The conductor 45 is above the lower terminal end 25 of and surrounds the tubular upper section 21 and is concentrically spaced therefrom a substantial distance leaving an annulus therebetween in excess of the jumping and bridging capability of the roaches. The conductor 45 is contiguous to and closely spaced from the inner diameter wall of the housing 49, and the roaches are forced to negotiate said conductor. In practice, the conductor 45 is comprised of a circular ring supported from circumferentially spaced insulators 46 carried by the wall of the housing 29. Electrical connection from the exterior of the housing 29 to the ring-shaped conductor 45 within the housing is through the aforesaid boss 40 and opening 41, there being an electrical cable or the like passing through a gland 47 threaded into the boss 40. Suitable state of the art means is employed to electify the conductor 45, applying potential thereof that will electrocute the roaches contacting the conductor 45.

From the foregoing it will be seen that I have provided a practical and direct way of exterminating roaches as they attempt entry into a household. The trap fitting that I provide stops roaches from entering either through the sewers or through vents, and the deceased bodies thereof are disposed of as debris when flushed down the waste pipe plumbing.

Having described only the typical preferred forms and applications of my invention, I do not wish to be limited or restricted to the specific details herein set forth, but wish to reserve to myself any modificaitons of variations that may appear to those skilled in the art as set forth within the limits of the following claims.

I claim:
1. A plumbing trap for roaches and the like to be installed in a vertically disposed waste pipe, and including;

axially spaced upper and lower tubular sections continuing from separated upper and lower portions of the vertically disposed waste pipe, the upper tubular section terminating at an end defining the upper extremity of an annular opening, the lower tubular section continuing upwardly and outwardly and then upwardly forming a housing surrounding the upper tubular section, the housing having a header joined to the upper tubular section establishing an annular chamber accessible from the lower tubular section through the annular opening between the spaced sections, and skilled means carried by the housing in spaced relationship to and surrounding said end of the upper tubular section and over which the roaches are forced to pass as they travel upwardly.

2. The plumbing trap as set forth in claim 1, wherein said end of the upper tubular section is disposed in a horizontal plane and open downwardly.

3. The plumbing trap as set forth in claim 2, wherein the downwardly open end of the upper tubular section has an inner diameter wall sharpened at said horizontal plane.

4. The plumbing trap as set forth in claim 1, wherein the space between the upper and lower tubular sections forming said annular opening is in excess of the jumping and bridging ability of the roaches.

5. The plumbing trap as set forth in claim 1, wherein the chamber space between the housing and upper tubular section is in excess of the jumping and bridging ability of the roaches.

6. The plumbing trap as set forth in claim 1, wherein the space between the upper and lower tubular sections forming said annular opening is in excess of the jumping and bridging ability of the roaches, and wherein the chamber spaced between the housing and upper tubular section is also in excess of the jumping and bridging ability of the roaches.

7. The plumbing trap as set forth in claim 1, wherein the killing means is a pool of poison toxic to roaches.

8. The plumbing trap as set forth in claim 1, wherein the killing means is a circular basin contiguous to the hosuing at the plane of the end defining said annular opening of the upper tubular section for maintaining a pool of poison toxic to the roaches.

9. The plumbing trap as set forth in claim 1, wherein flush means opens into the housing from the exterior thereof and in alignment with the killing means.

10. The plumbing trap as set forth in claim 7, wherein fill and flush means opens into the housing from the exterior thereof and in alignment with the killing means.

11. The plumbing trap as set forth in claim 8, wherein fill and flush means opens into the housing from the exterior thereof and in alignment with the killing means.

12. The plumbing trap as set forth in claim 1, wherein the killing means is an electrical conductor charged to electrocute the roaches.

13. The plumbing trap as set forth in claim 1, wherein the killing means is a circular electrical conductor supported by insulators from the housing above the plane of the end defining said annular opening of the upper tubular section and charged electrically to electrocute the roaches.

14. The plumbing trap as set forth in claim 1, wherein the killing means is a circular electrical conductor supported by insulators from the housing above the plane of the end defining said annular opening of the upper tubular section and charged electrically to electrocute the roaches, and wherein flush means opens into the hosuing from the exterior thereof and in alignment with the killing means to flush away deceased roaches.

* * * * *